(12) United States Patent
Lifson et al.

(10) Patent No.: US 8,375,735 B2
(45) Date of Patent: Feb. 19, 2013

(54) REFRIGERATION SYSTEMS WITH VOLTAGE MODULATED COMPRESSOR MOTORS AND METHODS OF THEIR CONTROL

(75) Inventors: Alexander Lifson, Manilus, NY (US); Michael F. Taras, Fayetteville, NY (US)

(73) Assignee: Carrier Corporation, Farmington, CT (US)

( * ) Notice: Subject to any disclaimer, the term of this patent is extended or adjusted under 35 U.S.C. 154(b) by 820 days.

(21) Appl. No.: 12/520,052

(22) PCT Filed: Dec. 18, 2006

(86) PCT No.: PCT/US2006/048025
§ 371 (c)(1),
(2), (4) Date: Jun. 18, 2009

(87) PCT Pub. No.: WO2008/076102
PCT Pub. Date: Jun. 26, 2008

(65) Prior Publication Data
US 2010/0043469 A1 Feb. 25, 2010

(51) Int. Cl.
*F25B 49/00* (2006.01)
*F25B 1/00* (2006.01)
(52) U.S. Cl. ............... 62/228.1; 62/228.5; 62/230
(58) Field of Classification Search ........... 62/158, 62/226, 228.1, 228.5, 230
See application file for complete search history.

(56) References Cited

U.S. PATENT DOCUMENTS

| | | | |
|---|---|---|---|
| 4,425,539 A * | 1/1984 | Wills | 318/771 |
| 4,820,130 A | 4/1989 | Eber et al. | |
| 6,047,556 A * | 4/2000 | Lifson | 62/196.2 |
| 6,533,552 B2 * | 3/2003 | Centers et al. | 417/12 |
| 6,753,670 B2 | 6/2004 | Kadah | |
| 2001/0045101 A1 * | 11/2001 | Graham et al. | 62/236 |
| 2002/0105301 A1 * | 8/2002 | Bush et al. | 318/771 |
| 2004/0177633 A1 * | 9/2004 | Moon et al. | 62/228.1 |

OTHER PUBLICATIONS

PCT International Report on Patentability of the International Searching Authority for International Patent Application No. PCT/US06/48025, Mar. 8, 2011, 6 pages.

* cited by examiner

*Primary Examiner* — Marc Norman
(74) *Attorney, Agent, or Firm* — Cantor Colburn LLP

(57) ABSTRACT

A refrigerant system is provided that includes a compressor, a motor for driving the compressor, a refrigerant system component, and a controller. The refrigerant system component can operate in a pulse width modulated mode having a loaded phase and an unloaded phase. The compressor motor is loaded in the loaded phase but unloaded in the unloaded phase. The controller applies a first voltage to the compressor motor in the loaded phase and a second voltage to the compressor motor in the unloaded phase. Here, the second voltage is less than the first voltage.

22 Claims, 2 Drawing Sheets

US 8,375,735 B2

REFRIGERATION SYSTEMS WITH VOLTAGE MODULATED COMPRESSOR MOTORS AND METHODS OF THEIR CONTROL

BACKGROUND OF THE INVENTION

1. Field of the Invention

The present disclosure is related to refrigerant systems and methods of their control. More particularly, the present disclosure is related to refrigerant systems having pulse width modulated refrigeration components.

2. Description of Related Art

Refrigerant systems are commonly used to provide conditioned air or other secondary loop fluid (such as water or glycol) to, for example, a refrigerator, a freezer, a building, a car, and other spaces with climate controlled environment.

The efficiency of refrigerant systems is directly related to the use of the system's refrigerant moving devices such as a compressor and secondary fluid moving devices such as fans or pumps. One method of increasing the efficiency of the refrigerant system is to efficiently unload these components during part-load operation to adequately reduce the capacity provided by a refrigerant system to more closely match the thermal demands in the conditioned environment.

One method of achieving capacity control is to continuously cycle the compressor motor between an "on" position and an "off" position. Typically, the compressor motor, when it is in the "on" position, operates at a constant speed. In this manner, a desired duty cycle for the compressor, and consequently capacity provided by the refrigerant system, can be achieved. However, the "on" and "off" cycling of the compressor motor is known to cause various undesired effects on the reliability of the refrigerant system. Additionally, quite often, a desired precise temperature and humidity control in the conditioned environment may not be achieved, causing discomfort to the occupant of the environment. Furthermore, there are irreversible losses associated with the compressor cycling between "on" and "off" positions that cannot be neglected.

Another prior art method proposed to achieve capacity control is to operate the compressor (and/or other refrigerant system components such as fans and pumps) in a pulse width modulated mode. Compressors operating in a pulse width modulated mode can circulate a time-averaged desired amount of refrigerant throughout the refrigerant system, and provide the desired capacity to satisfy thermal load demands in the climate conditioned environment, without the need to start and stop a compressor motor, which operates at a relatively constant speed.

For example, compressors can be operated in a pulse width modulated mode by employing two or more mechanical elements, such as orbiting and non-orbiting scroll members, that can move in and out of contact with one another at a predetermined rate to selectively compress the refrigerant during the time intervals when the scroll members are in contact with one another. The control can selectively engage and disengage the mechanical compression elements, thereby periodically providing the compressed refrigerant flow by the compressor and throughout the refrigerant system, while allowing the motor to run at a relatively constant speed.

Another known method to provide a lower refrigerant flow is to operate a refrigerant flow control device such as a solenoid valve, preferably at the compressor suction, in a pulse width modulated mode. The operation of the valve in the pulse width modulated mode is achieved by rapidly opening and closing the valve (with a cycle time normally varying from 2 to 20 seconds), while allowing the motor to operate at a relatively constant speed.

However, there is a continuing need for refrigerant systems and methods of controlling such systems that further improve upon the efficiency of prior art refrigerant systems.

BRIEF SUMMARY OF THE INVENTION

A refrigerant system is provided that includes a compressor, a motor for driving the compressor, a refrigerant system component, and a controller. The refrigerant system component can operate in a pulse width modulated mode having a loaded phase and an unloaded phase. The compressor motor is loaded in the loaded phase but unloaded in the unloaded phase. The controller applies a first voltage to the compressor motor in the loaded phase and a second voltage to the compressor motor in the unloaded phase. Here, the second voltage is less than the first voltage.

A method of controlling a refrigerant system is also provided. The method includes switching a refrigeration component between a loaded phase and an unloaded phase; applying a first voltage to a compressor motor in the loaded phase; and applying a second voltage to the compressor motor in the unloaded phase. Here, the second voltage is lower than the first voltage.

The above-described and other features and advantages of the present disclosure will be appreciated and understood by those skilled in the art from the following detailed description, drawings, and appended claims.

DETAILED DESCRIPTION OF THE INVENTION

Figure 1:
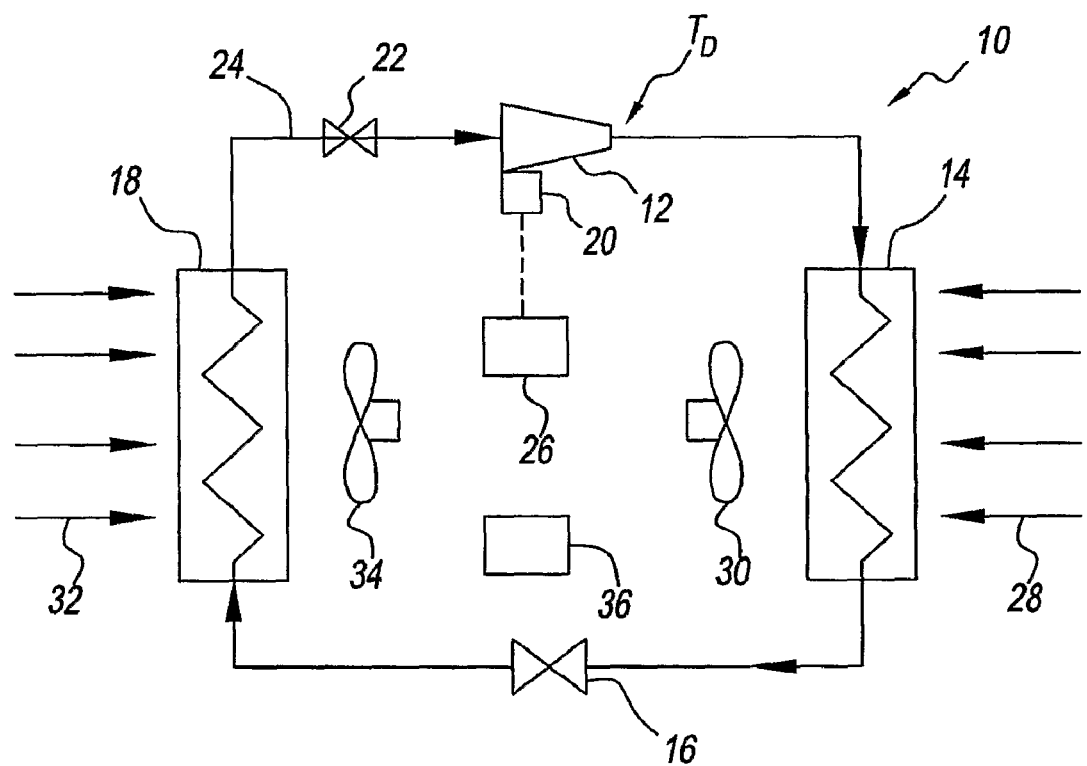
FIG. 1 is a schematic depiction of an exemplary embodiment of a refrigerant system according to the present disclosure.

Referring to the drawing and in particular to FIG. 1, an exemplary embodiment of a refrigerant system according to the present disclosure, generally indicated by reference numeral 10, is shown.

Refrigerant system 10 includes a compressor 12, a condenser 14, an expansion device 16, and an evaporator 18, all in fluid communication with one another to provide, for instance, a cooling or heating function using a known refrigerant (not shown). Compressor 12 is driven by a compressor motor 20. In some embodiments, refrigerant system 10 can include a suction valve 22 positioned on a suction line 24 leading to compressor 12. Refrigerant system 10 also includes a controller 26 for controlling the operation of the various components of the refrigerant system such as compressor 12, expansion device 16, compressor motor 20, and suction valve 22.

As known in the art, the compressor motor 20 can be positioned internally, or inside a compressor shell (not shown), for hermetic or semi-hermetic compressors or externally, or outside the compressor shell, for open-drive compressors. Also, as known in the art, condenser 14 becomes a gas cooler in the transcritical mode of operation (in comparison to a better known subcritical mode of operation). Further, it has to be understood that basic refrigerant system 10 exhibited in FIG. 1 may have various options and enhancement features. All these systems are within the scope and can equally benefit from the present disclosure.

Advantageously, refrigerant system 10 is configured to operate in a normal (or conventional) mode and in a pulse width modulated (PWM) mode. In the normal mode, compressor motor 20 is loaded. However, in the PWM mode, compressor motor 20 is selectively loaded and unloaded. Thus, PWM mode includes a loaded phase and an unloaded phase.

As used herein, the terms "unloaded" and "unloaded phase" shall mean that the load on compressor motor 20 is at least partially reduced as compared to the load on the compressor motor in a "loaded" state or "loaded phase" of the PWM mode.

In one embodiment, refrigerant system 10 is configured to operate compressor 12 in the normal mode and the PWM mode. In another embodiment, refrigerant system 10 is configured to operate suction valve 22 in the normal mode and the PWM mode. It should be recognized that refrigerant system 10 is described above by way of two exemplary methods, compressor 12 and/or suction valve 22, for selectively loading and unloading compressor motor 20. Of course, it is contemplated by the present disclosure for refrigeration system 10 to have any refrigeration component that is operable by controller 26 in the PWM mode so that compressor motor 20 can be selectively loaded and unloaded.

In this manner, refrigerant system 10 is configured to selectively load compressor motor 20 when in the normal mode and the loaded phase of the PWM mode. Further, refrigerant system 10 is configured to selectively unload compressor motor 20 when in the unloaded phase of the PWM mode.

During the normal mode, refrigerant system 10 operates, for instance, in a typical cooling cycle. Here, compressor 12 draws low-pressure refrigerant, in a vapor form and compresses this low-pressure vapor refrigerant into a high pressure and temperature refrigerant. From compressor 12, the vapor refrigerant flows into condenser 14. Condenser 14 acts as a heat rejection heat exchanger where during heat transfer interaction with a secondary loop fluid 28, such as outside or ambient air, that is driven by a fan or pump 30. In this manner, the vapor refrigerant is desuperheated to the point where it condenses to a liquid and then is typically subcooled.

The liquid refrigerant exits condenser 14 and flows into expansion device 16. Expansion device 16 expands liquid refrigerant into a low-pressure, low-temperature, two-phase mixture. The two-phase refrigerant mixture flows into evaporator 18. Evaporator 18 acts as a heat accepting heat exchanger where during heat transfer interaction with another secondary fluid 32, such as air supplied to a conditioned environment, that is driven by a fan or pump 34. In this manner, the refrigerant is evaporated and typically superheated while the secondary fluid is cooled and usually dehumidified. The vapor refrigerant then flows from evaporator 18 back to compressor 12.

Under certain part-load conditions, refrigerant system 10 operates in the PWM mode, in which the time-averaged refrigerant flow circulating throughout the refrigerant system is reduced, without the need to start and stop compressor motor 20.

For example, compressor 12 can be a scroll compressor, which has a device for engaging and disengaging scroll elements in a rapid cycling manner, and is commonly known as a digital scroll compressor. This allows for circulation of the compressed refrigerant vapor (i.e., the loaded phase) throughout refrigerant system 10 only during the time intervals within the PWM mode when the scroll elements are engaged. Similar methodology can be applied to other compressor types as well.

Alternately, suction valve 22, which can be a solenoid or stepper motor valve, can cycle between open and closed positions in the PWM mode to provide the reduced time-averaged refrigerant flow to the suction port of compressor 12. When suction valve 22 is closed, the refrigerant flow to compressor 12 is interrupted (i.e., the unloaded phase), and when the suction valve is open, full refrigerant flow is provided to the compressor (i.e., the loaded phase).

It has been determined by the present disclosure that when compressor 12 is operated in the PWM mode such that compressor motor 20 is unloaded during the time intervals when it predominantly doesn't compress and/or circulate the refrigerant throughout the refrigerant system can lead to inefficiency. Specifically, it has been determined by the present disclosure that the operating efficiency and the power consumption of compressor motor 20, in the unloaded phase of the PWM mode, can be improved by reducing the voltage to the motor during this unloaded phase.

Additionally, it has been determined by the present disclosure that reducing the voltage to compressor motor 20, when in the unloaded phase of the PWM mode, allows compressor 12 to generate less heat. The generation of less heat by compressor 12 results in a lower refrigerant discharge temperature ($T_d$) than would not otherwise be possible. It has also been determined by the present disclosure that lowering the refrigerant discharge temperature ($T_d$) can improve the reliability of compressor 12. Further, it has been determined by the present disclosure that lowering the refrigerant discharge temperature ($T_d$) improves the performance of condenser 14, since the condenser needs to remove less heat from the refrigerant.

Advantageously, controller 26 is configured to adjust the voltage to compressor motor 20 depending upon the load placed on the motor by compressor 12. Moreover, controller 26 is configured to coordinate the control of compressor 12 and/or expansion valve 22 among the normal mode, the loaded phase of the PWM mode, and the unloaded phase of the PWM mode with the control of the voltage of compressor motor 20. Specifically, controller 26 provides a normal or full line voltage to compressor motor 20 when in the normal mode and the loaded phase of the PWM mode. However, controller 26 provides a reduced voltage to compressor motor 20 when in the unloaded phase of the PWM mode. Thus, controller 26 adjusts the voltage to compressor motor 20 to the normal or line voltage when the motor is loaded, but reduces the voltage to the compressor motor 20 to a lower voltage when the motor is unloaded. It has to be understood that the voltage applied to the compressor motor 20 and the corresponding phase (loaded or unloaded) of the PWM mode do not need to be exactly synchronized. For example, there can be a time delay to apply a reduced voltage to the compressor motor 20 in relation to the engagement of the unloaded phase of the PWM mode of operation. It is also possible that the time interval during which the voltage is reduced is either slightly longer or slightly shorter than the time interval during which the motor is in the unloaded phase of the PWM cycle. Also, the reduced voltage values, as compared to the full voltage value, can be adjusted depending on the refrigerant system operating conditions.

In an exemplary embodiment, controller 26 controls the reduced voltage to less than about 85% of the full line voltage, preferably less than about 75% of the full line voltage, with less than about 65% of the full line voltage being most preferred.

Preferably, the controller 26 rapidly and synchronously adjusts the voltage to compressor motor 20 with respect to the cycling of the compressor 12 and/or expansion valve 22 between the loaded and unloaded phases of the PWM mode of operation. In some embodiments, controller 26 is configured to complete the voltage cycle to compressor motor 20, in less than about 1 minute, preferably between about 2 seconds to about 30 seconds, and any subranges therebetween.

Accordingly, in some embodiments, controller 26 synchronizes the voltage cycle between the line voltage and the reduced voltage to the pulse width modulated cycle between the loaded and unloaded phases.

In other embodiments, controller 26 offsets the voltage cycle and the pulse width modulated cycle from one another by a predetermined time. Preferably, the predetermined time is between about 1 second to about 3 seconds.

Figure 2:
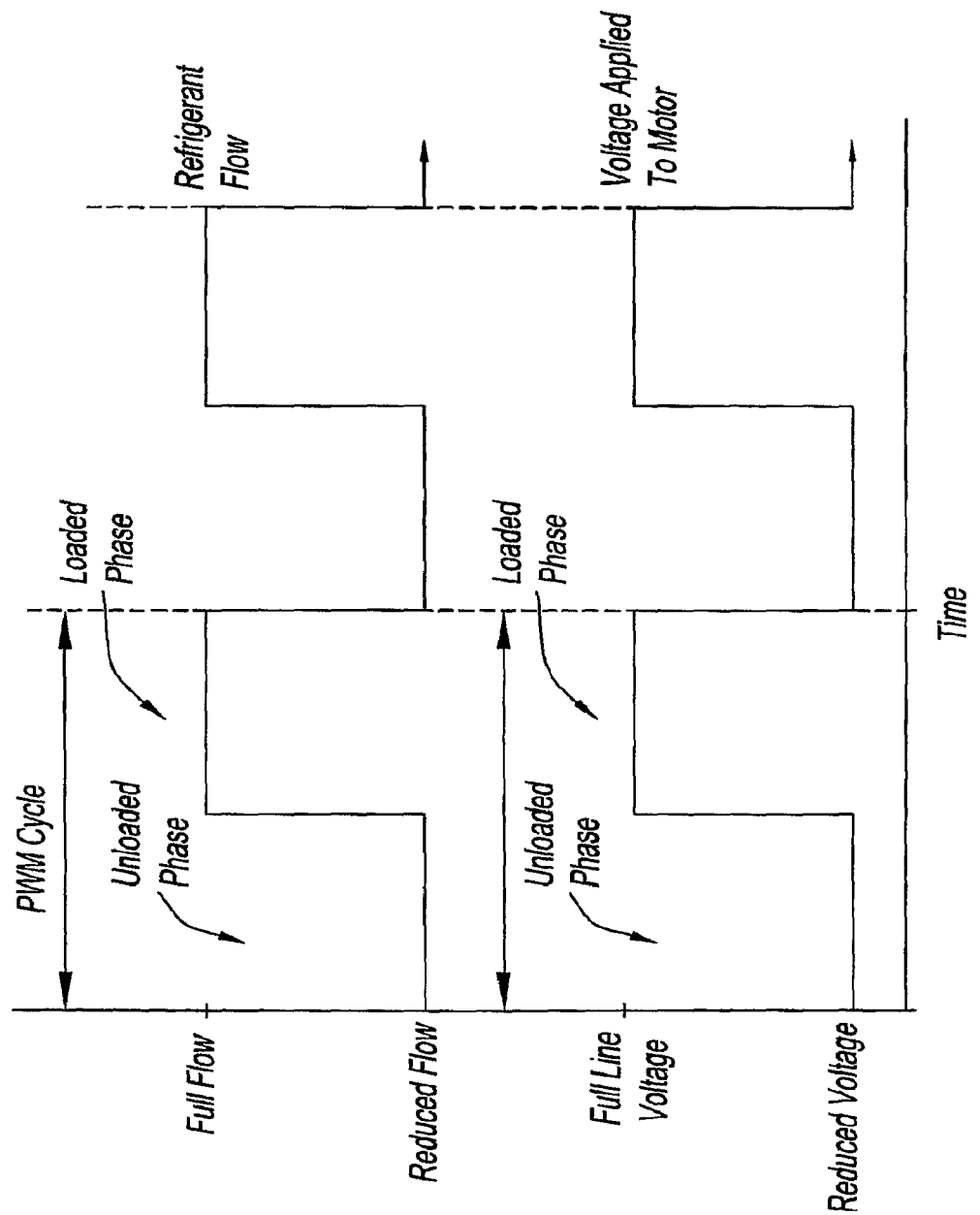
FIG. 2 is a graph showing an exemplary embodiment of a synchronous pulse width modulation control of refrigerant flow and voltage according to the present disclosure.

Controller 26 can adjust the voltage to compressor motor 20 in any desired manner. As shown in FIG. 2, the voltage cycles between the normal or full line voltage and the reduced voltage value rapidly and predominantly coherently with the PWM mode for the compressor 12. Further, although the cycle is represented as a square wave in FIG. 2, other waveforms are also contemplated for use by the present disclosure. For example, it is contemplated by the present disclosure for controller 26 to control the voltage to compressor motor 20 to have any desired wave form such as, but not limited to, a square wave, a sinusoidal wave, trapezoidal wave, and any combinations thereof.

In some embodiments, controller 26 can reduce voltage supplied to compressor motor 20 slightly before the motor is switched to the unloaded phase of the PWM mode. In this manner, controller 26 utilizes the inertia of compressor motor 20 for a short trailing period of time during the loaded phase of the PWM mode. Similarly, controller 26 can apply the full line voltage to compressor motor 20 slightly before the motor is switched to the loaded phase of the PWM mode. Here, the voltage cycle between the full line voltage and the reduced voltage can be substantially identical in length, but offset from, the pulse width modulated cycle between the loaded and unloaded phases.

In one embodiment, controller 26 can make use of the wiring connection configuration of compressor motor 20, where the compressor motor can be adjusted to use a DELTA configuration when in the unloaded state, and a WYE configuration when in the loaded state.

Previously, control between the WYE and DELTA configurations has been used during a motor startup to limit the starting inrush current. A technique sometimes used is a star-delta starting, where the motor coils are initially connected in the WYE configuration, while a motor is accelerating to a full speed, during a startup, and then switched to the DELTA configuration when the motor has reached a relatively constant speed.

Advantageously, it has been determined by the present disclosure that controller 26 can be programmed to control compressor motor 20 between the WYE and DELTA configurations not only during startup, but also in a rapid cycle manner in the PWM mode of operation based upon the loading state of compressor motor 20. Furthermore, controller 26 can detect when compressor 12 and/or suction valve 22 are switched to the unloaded phase of the PWM mode, and accordingly switch the voltage to compressor motor 20 to the reduced voltage.

In this embodiment, the present disclosure makes conversion of an existing refrigerant system relatively simple by merely adding of the functionality of controller 26 to the existing motor controller so that the existing motor controller switches between the WYE and DELTA configurations based upon the loaded or unloaded phase of the PWM mode for compressor motor 20.

In other embodiments, controller 26 can be a transformer (not shown) that can be used to directly vary the applied voltage as required by the motor load. In this case, the transformer can also be operating in the PWM mode, without requiring any additional hardware installation.

It should be recognized that controller 26 is described above by way of example only. Of course, any controller 26 that is sufficient to adjust the voltage of compressor motor 20 at required PWM cycle rate is contemplated for use in the refrigerant system of the present disclosure.

Preferably, controller 26 controls compressor motor 20 between its loaded and unloaded voltages and also controls the switching of compressor 12 and/or suction valve 22 among the normal mode, the loaded phase of the PWM mode, and the unloaded phase of the PWM mode. For example, controller 26 can rely on solid state switching technology, using solid-state relays, solid-state contactors, and the like to control the operation of compressor motor 20.

In this embodiment, controller 26 controls the operation of compressor 12 and/or suction valve 22 among the unloaded phase of the PWM mode with little or no compression and circulation of the refrigerant and the normal mode or loaded phase of the PWM mode with complete compression and circulation of the refrigerant based, at least in part, upon one or more inputs received by a refrigerant system controller 36. Refrigerant system controller 36 can be combined with or separate from controller 26.

The time interval for compressor motor 20 to spend in the loaded phase of the PWM mode, in relation to the time interval for the compressor motor 20 to spend in the unloaded phase of the PWM mode is determined by the thermal load demands in the conditioned space and environmental conditions. The higher the thermal load demands, the more time compressor motor 20 spends in the normal mode and in the loaded phase of the PWM mode. The cycle frequency is determined by the thermal inertia of refrigerant system 10 and the reliability of the cycling refrigerant components (e.g., compressor 12, suction valve 22).

Therefore, the cycle time should be short enough not to cause noticeable variations of the parameters such as temperature and humidity in the climate controlled environment. On the other hand, the cycling rate is limited by reliability requirements of the cycling components.

When controller 26 determines that compressor 12 and/or suction valve 22 should be switched to the unloaded phase of the PWM mode so that refrigerant system 10 can match the reduced thermal load demands in the climate controlled environment or to satisfy less stringent environmental conditions, the controller accordingly reduces the voltage supplied to the compressor motor.

In this manner, refrigerant system 10 has increased efficiency, as compared to prior art systems, in that as compressor 12 is switched to the PWM mode, the voltage to compressor motor 20 is also reduced to further increase the efficiency of the motor and reduce power input.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A refrigerant system comprising:
   a compressor motor;
   the compressor motor configured for operation in a normal, full line voltage mode, a pulse width modulated mode having a loaded phase and a pulse width modulated mode having an unloaded phase, said compressor motor being loaded in said loaded phase and said compressor motor being unloaded in said unloaded phase; and a controller configured to apply a first voltage to said compressor motor in said normal mode, apply the first voltage to said compressor motor in the pulse width modulated mode loaded phase and apply a second voltage to said compressor motor in said pulse width modulated mode unloaded phase, said second voltage being less than said first voltage;

wherein said controller uses a DELTA wiring configuration in said unloaded phase and uses a WYE wiring configuration in said loaded phase.

2. The refrigerant system as in claim 1, further comprising a suction valve disposed at a suction line leading to a compressor driven by said compressor motor.

3. The refrigerant system as in claim 1, wherein said second voltage is less than about 85% of said first voltage.

4. The refrigerant system as in claim 1, wherein said second voltage is less than about 65% of said first voltage.

5. The refrigerant system as in claim 1, wherein said controller is further configured to control said compressor motor to switch between said loaded and unloaded phases of said pulse width modulate mode.

6. The refrigerant system as in claim 1, wherein said controller synchronizes a voltage cycle between said first and second voltages to a pulse width modulated cycle between said loaded and unloaded phases.

7. The refrigerant system as in claim 1, wherein said controller offsets a voltage cycle between said first and second voltages to a pulse width modulated cycle between said loaded and unloaded phases.

8. The refrigerant system as in claim 7, wherein said controller offsets said voltage cycle by about 1 second to about 3 seconds.

9. The refrigerant system as in claim 1, wherein said controller provides a voltage cycle between said first and second voltages that is identical in length to a pulse width modulated cycle between said loaded and unloaded phases.

10. The refrigerant system as in claim 1, wherein said controller provides a voltage cycle between said first and second voltages that is different in length to a pulse width modulated cycle between said loaded and unloaded phases.

11. The refrigerant system as in claim 1, wherein said controller comprises a transformer to directly vary voltage to said compressor motor between said first and second voltages.

12. A method of controlling a refrigerant system, comprising:

switching a refrigerant system compressor motor between a normal, full line voltage mode, a pulse width modulated loaded phase and pulse width modulated unloaded phase;

applying a first voltage to the compressor motor during the normal mode;

applying the first voltage to the compressor motor in said pulse width modulated loaded phase; and applying a second voltage to said compressor motor in said pulse width modulated unloaded phase, said second voltage being lower than said first voltage;

wherein adjusting voltage to said compressor motor comprises switching between a DELTA wiring configuration in said unloaded phase and a WYE wiring configuration in said loaded phase.

13. The method as in claim 12, further comprising:
closing a suction valve disposed at a suction line leading to a compressor driven by said compressor motor to provide said unloaded phase; and
opening said suction valve to provide said loaded phase.

14. The method as in claim 12, wherein switching said compressor motor between said loaded phase and said unloaded phase comprises:
controlling a compressor driven by said compressor motor to compress said refrigerant in said loaded phase; and
controlling said compressor driven by said compressor motor to provide a reduced compression to said refrigerant in said unloaded phase.

15. The method as in claim 12, wherein said second voltage is less than about 75% of said first voltage.

16. The method as in claim 12, further comprising synchronizing a voltage cycle between said first and second voltages to a pulse width modulated cycle between said loaded and unloaded phases.

17. The method as in claim 12, further comprising offsetting a voltage cycle between said first and second voltages to a pulse width modulated cycle between said loaded and unloaded phases.

18. The method as in claim 17, comprising offsetting said voltage cycle by about 1 second to about 3 seconds.

19. The method as in claim 12, further comprising providing a voltage cycle between said first and second voltages that is identical in length to a pulse width modulated cycle between said loaded and unloaded phases.

20. The method as in claim 12, further comprising providing a voltage cycle between said first and second voltages that is different in length to a pulse width modulated cycle between said loaded and unloaded phases.

21. The method as in claim 12, further comprising controlling a transformer to directly vary voltage to said compressor motor between said first and second voltages.

22. A refrigerant system comprising:
a compressor motor;
the compressor motor configured for operation in a normal, full line voltage mode, a pulse width modulated mode having a loaded phase and a pulse width modulated mode having an unloaded phase, said compressor motor being loaded in said loaded phase and said compressor motor being unloaded in said unloaded phase;
a controller configured to apply a first voltage to said compressor motor in said normal mode, apply the first voltage to said compressor motor in the pulse width modulated mode loaded phase and apply a second voltage to said compressor motor in said pulse width modulated mode unloaded phase, said second voltage being less than said first voltage; and
a compressor driven by said compressor motor;
wherein said controller is further configured to control said compressor motor to switch between said loaded and unloaded phases of said pulse width modulated mode;
wherein said controller offsets a voltage cycle between said first and second voltages to a pulse width modulated cycle between said loaded and unloaded phases, wherein said controller offsets said voltage cycle by about 1 second to about 3 seconds;
wherein said controller provides a voltage cycle between said first and second voltages that is different in length to a pulse width modulated cycle between said loaded and unloaded phases.

* * * * *